United States Patent
Tewes

(10) Patent No.: US 6,659,357 B1
(45) Date of Patent: Dec. 9, 2003

(54) DEVICE FOR PROCESSING DATA CARRIER CARDS

(75) Inventor: Udo Tewes, Bad Oeynhausen (DE)

(73) Assignee: Wincor Nixdorf GmbH & Co. KG, Paderborn (DE)

( * ) Notice: Subject to any disclaimer, the term of this patent is extended or adjusted under 35 U.S.C. 154(b) by 0 days.

(21) Appl. No.: 10/181,995

(22) PCT Filed: Nov. 15, 2000

(86) PCT No.: PCT/EP00/11314

§ 371 (c)(1),
(2), (4) Date: Oct. 17, 2002

(87) PCT Pub. No.: WO01/55959

PCT Pub. Date: Aug. 2, 2001

(30) Foreign Application Priority Data

Jan. 24, 2000  (DE) .......................... 100 02 837

(51) Int. Cl.⁷ ............................... G06K 19/06
(52) U.S. Cl. ......................... 235/492; 235/493
(58) Field of Search .................. 235/492, 493

(56) References Cited

U.S. PATENT DOCUMENTS 4,527,262 A   7/1985   Manto 6,129,275 A * 10/2000 Urquhart et al. .......... 235/492

FOREIGN PATENT DOCUMENTS

| DE | 196 34 688 A1 | 3/1998 |
| DE | 196 44 306 A1 | 10/1999 |
| EP | 0 784 290 A2 | 12/1996 |
| EP | 0 911 751 A2 | 4/1999 |
| EP | 0 784 290 B1 | 3/2002 |

* cited by examiner

Primary Examiner—Harold I. Pitts
(74) Attorney, Agent, or Firm—McCormick, Paulding & Huber LLP

(57) ABSTRACT

The invention relates to a device for processing data carrier cards. Said device comprises a transport device (10) for retracting and dispensing a data carrier card (12), a read/write device (18) for exchanging data with the data carrier card (12), and a control device (42) for controlling the transport device (10) and the read/write device (18). The transport device is (10) is provided with a retractor/dispenser portion (16) and an adjoining intermediate storage (22) for cards.

10 Claims, 1 Drawing Sheet

DEVICE FOR PROCESSING DATA CARRIER CARDS

CROSS-REFERENCE TO RELATED APPLICATIONS

This application is entitled to the benefit of and incorporates by reference essential subject matter disclosed in International Application No. PCT/EP00/11314 filed on Nov. 15, 2000 and German Patent Application No. 100 02 837.3 filed on Jan. 24, 2000.

The invention concerns a device for the processing of data carrier cards including a transport device with an input/output section for drawing in and dispensing a data carrier card, a write/read device for data exchange with the data carrier card, and a control device for controlling the transport device and the write/read device, with means being provided for storing data on a first card using data stored on a second card.

Data carrier cards with magnetic strips and/or integrated chips have an increasing usage as identification cards or payment means and the like. In many cases, the cards are linked to persons. Their distribution has certain underlying security regulations and it is therefore correspondingly expensive and complicated.

Card dispensers are already known which contain a card store for receiving a supply of standardized cards, which however are generally not processed before their dispensing.

Further, from DE 196 34 688 A1 a device is known, which makes possible the processing of cards, that is the reading of data stored on the card and also the storing of data, and which has a card magazine in which accepted cards are deposited and from which they can again be taken. Thereby in a cyclic manner cards can be individually processed, stored and, after an eventual second processing, can be again dispensed, with the cyclic handling of the cards however proceeding according to the first in/first out principle. A card can therefore be dispensed again only after it has run through the entire card magazine.

From EP-A-0 911 751 a device of the aforementioned kind is already known which serves for the rebooking of data from one chip card onto another. In this case two card boxes are arranged on a swing so that the card boxes can selectively be brought into alignment with the input/output section of the device. A reading head is associated with each card box. First the two cards are moved into the card boxes, with these boxes being brought one after the other into alignment with the input/output section of the apparatus. Then the cards are contacted by their respective reading heads so that data from one card can be rewritten onto the other. The expense of the apparatus for this solution is relatively high.

From EP-A-0 784 290 a further apparatus is known which likewise makes it possible to rewrite data from a magnetic strip card onto a Smart-Card. In this case, two separate card boxes are provided. One of these boxes serves for the input of a magnetic strip card which is read and subsequently moved to a store. The read data is stored. The second box serves for dispensing the Smart-Card, which is taken from a store and moved into the second card box. There the data read from the first card is taken into memory. Subsequently, the card can be dispensed to a customer. Here also the expense of the apparatus is relatively large. The practical use of the apparatus is limited.

The invention has as its object the making of a device of the aforementioned kind in such a way that the usage possibilities of a data carrier card of the above mentioned kind can be increased.

This object is solved in accordance with the invention in that the write/read device is arranged in the input/output section, in that the transport device has an intermediate card store following the input/output section and in that the storage of data on the first card takes place while the second card is held in the intermediate card store.

The processing of data carrier cards can therefore, for example, so take place that first of all the second card is inserted into the device and the data stored on it is read. Subsequently, the first card is inserted onto which data is then written under use of the data read from the second card. For example, the second card can be an identification card, which authorizes the dispensing of new cards.

The construction can, however, also be such that the data is transferred directly from one card onto another, for example, a transfer booking. Therefore, a customer can take hold of certain services with his card being charged accordingly. Subsequently, the charged amount on the card of a purchaser or, for example, of a bartender can be booked onto or deducted from another card.

The device of the invention can also be so used in that data from a card having one storage technology can be rebooked onto a card with another storage technology with the write/read device in this case for the processing of the cards being constructed with different storage media.

An essential widening of the use possibilities of the inventive device results if the transport device has associated with it a card magazine with the intermediate card store being provided with at least two separate transport paths, which individually and selectively are connectable with the input/output section and of which paths at least one can be selectively connected with the card magazine. In the case of this embodiment cards can be removed from the card magazine and for example with the help of data are enabled or personalized, which data is read from another data carrier card, which then is held in the intermediate card store, so long as it is needed. The cards removed from the card magazine, as the case may be, can also already be provided with certain permanent data. A further possibility of use results if the card magazine has a plurality of compartments each for the storing of at least one data carrier card, with the transport device and the card magazine being so adjustable that one selected compartment aligns with one transport path of the intermediate card store, and with transfer means being provided for transferring a data carrier card from the transport device into the respective compartment and/or from that compartment to the transport device. In this case a given supply of cards can be personalized or actualized in the above-described way and subsequently be put into the card magazine.

The transfer means can in this case have at least one pusher for the purpose of pushing a data carrier card into the respective compartment or to remove it from the compartment. In order to be able to correct faults in the insertion of cards into the transport device the transport device can be provided with a card turning station for turning a card about its transverse axis and/or its longitudinal axis and/or a height axis perpendicular to the plane of the card. A space saving arrangement in this case can be achieved by constructing the intermediate card store as a turning station.

BRIEF DESCRIPTION OF THE DRAWINGS

Further features and advantages of the invention will be apparent from the following description, which in combination with the accompanying drawings explains the invention by way of an exemplary embodiment. The drawings are.

DESCRIPTION OF THE PREFERRED EMBODIMENT

Figure 1:
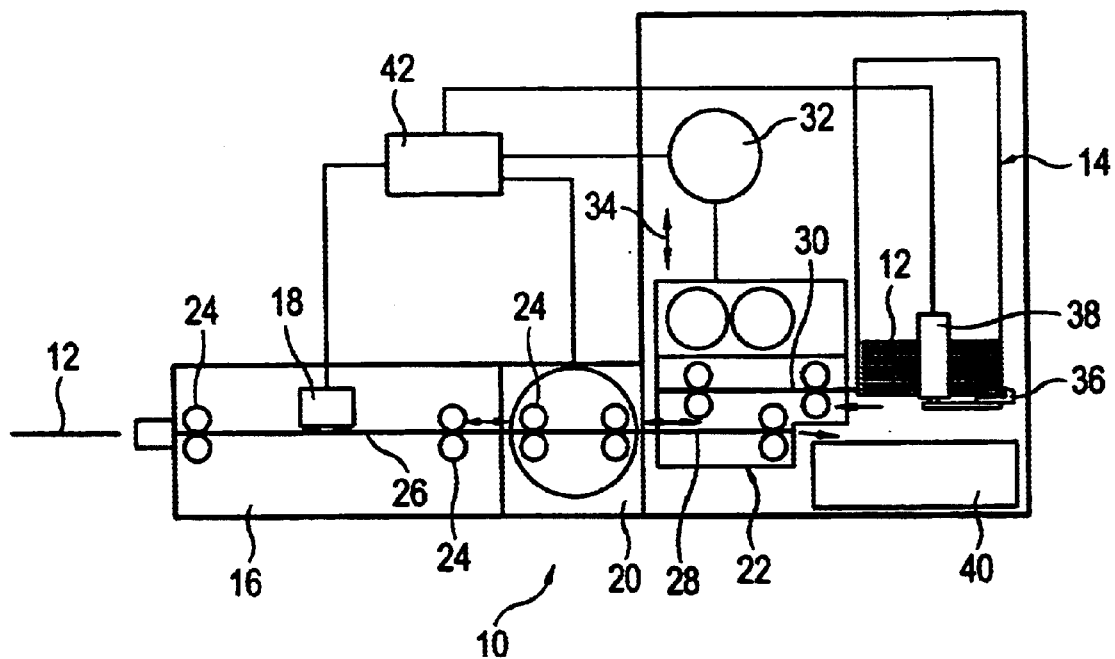
FIG. 1 a schematic side view of a card processing apparatus according to the invention in a first position of the intermediate card store.
Figure 2:
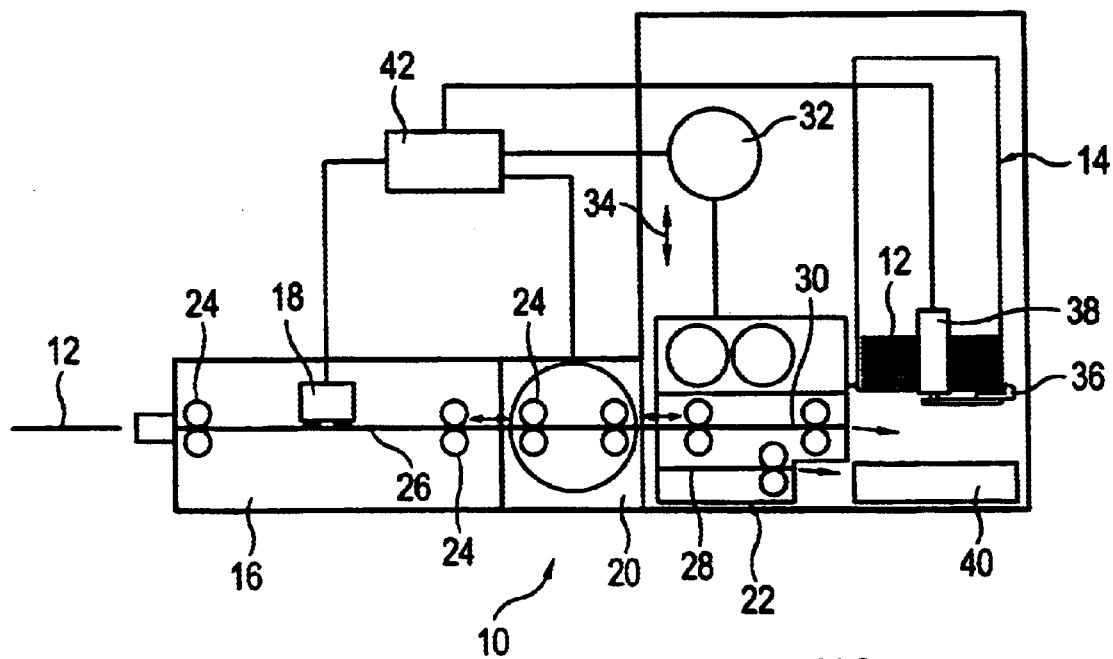
FIG. 2 a view corresponding to FIG. 1 in a second position of the intermediate card store.

The apparatus illustrated schematically in FIG. 1 and 2 includes a transport device, indicated generally at 10, for data cards 12 which are either inserted from outside of the transport device or are kept in a card magazine 14.

The transport device 10 includes an input/output section 16, inside of which is arranged a write/read head 18, a card turning station 20 and an intermediate card store 22. Transport roll pairs 24 define a transport path 26 in the input/output section 16 as well as in the turning station 20 and in path sections 28, 20 in the intermediate card store 22.

The write/read head 18 is defined for the reading and writing of magnetic strips and/or for data connection with a chip card with integrated chip by contact with its contact elements and/or without contact, for example by capacitive, inductive or RF-coupling, so that cards with different memory and/or connection technologies can be processed.

The cards in the illustrated example can be rotated about their transverse axis in the card turning station 20. It is equally imaginable that the turning station be so implemented that the cards are alternatively or additionally rotatable about their longitudinal axis and their height axis directed perpendicular to the card planes, in order to correctly position the cards relative to the write/reading head 18, if they are inserted by the user incorrectly into input/output section 16. The card turning station 20 can instead also be integrated into the intermediate card store 22 so that it can be made as a turning station.

The intermediate card store 22 is in its entirety adjustable, by means of a schematically indicated drive 32, in the direction of the double arrow 34 between the position illustrated in FIG. 1, in which the lower path section 28 is aligned with the upper dispensing position of the turning station 20 and the upper path section 30 is aligned with an output position of the card magazine 14, and a lower position shown in FIG. 2 in which the upper path section 30 is aligned with the delivery position of the turning station 20.

The cards 12 can be taken from the card magazine 14 with the help of a pusher 36 which is driven by a motor 38. Below the card magazine 14 is a collection compartment 40.

The individual functions of the so far described device can be controlled by a control unit 42, as indicated in the figures.

The construction of the intermediate card store or delivery section 22 with two transport paths sections 28,30 offers the possibility of an intermediate storage of a card not ejected by the card magazine, but inserted from the outside. For example a card from which data is to be rewritten onto another card or whose data is necessary for the writing of another card, can first be inserted through the input/output section into the path section 28 of the intermediate card store 22, with the intermediate card store being in the position illustrated in FIG. 1. In the same position of the intermediate card store 22 by means of the pusher 36 a card 12 is taken from the card magazine 14 and pushed into the path section 30. Then the intermediate card store 22 is lowered to the position illustrated in FIG. 2, so that the removed card can be transported into the input/output section 16 through the turning station 20. During this time the first named card remains in the path section 28 of the intermediate card store 22. One such card can for example be an identification card, which authorizes the output of new cards or it can also for example contain a credit balance from which a partial credit is taken and stored onto a card taken from the card magazine 14.

In another way, both cards can be inserted from the outside into the input/output section 16, with the first inserted card being stored in the intermediate card store 22. In this case the same functions can be carried out as already described above.

Basically there exists also the possibility that the card magazine 14 is constructed not only as a card dispenser but that it also be provided with compartments in which the cards, with the help of an adjustment of the intermediate card store up and down in the direction of the double arrow 32, can be put away so that the cards can also again be locatable and for example can be several times taken in and again given out. If a new dispensing of cards is not intended, the collection compartment 40 into which the cards from the path sections 28,30 of the intermediate card store 22 can be laid away, as indicated in FIGS. 1 and 2 by the arrows, is generally sufficient.

The device of the invention can in general be used for accounting systems in which a personalized card is dispensed through an SB-Terminal, on which credits are booked and this card can then later for final accounting be given back to the terminal. A further application for one such solution would be for example the time dependent use of computers (for example in Internet-cafes) or the cost accounting in an inn (electronic beer check). A further application would be for example in a hotel with an automatic self-service check-in/check-out system, in which the entry card for a room is given out and again taken in or stored at a terminal. The cards associated with the individual rooms contain fixed data such as for example a key combination for opening the door lock. On the other hand, the data can be personalized for the present guest so that through this card a final reckoning takes place.

It will be understood that the solution of the invention offers an abundance of application possibilities in which data is transferred between a first card and a second card or data is to be written into the memory of a card through the use of data stored on another card. All of these functions can be realized in simple and rational ways through the combination of a customary card write/read module with a card magazine and the described intermediate card store.

What is claimed is:

1. A device for processing data carrier cards comprising a transport device (10) with an input/output section (16) for taking in and dispensing a data carrier card, a write/read device (18) for data exchange with the data carrier cards (12) and a control device (42) for controlling the transport device (10) and the write/read device (18), with means being provided for storing data on a first card using data stored on a second card, characterized in that the write/read device (18) is arranged in the input/output section (16), in that the transport device (10) has an intermediate card store (22) following the input/output section (16) and that the storage of data on the first card takes place while the second card is held in the intermediate card store (22).

2. A device according to claim 1, characterized in that it has means (42, 18) for transmitting data from a first card to a second card, while one of the cards is held in the intermediate card store (22).

3. A device according to claim 1, characterized in that the write/read device (18) is constructed for the processing of data carrier cards (12) with different store media and/or data connecting techniques.

4. A device according to claim 1, characterized in that the intermediate card store (22) is provided with at least two separate transport paths (28, 30) which are individually and selectively connectable with the input/output section (16).

5. A device according to claim 4, further characterized in that the transport device (10) is associated with a card magazine (14) and that at least one of the transport paths (28, 30) is selectively connectable with the card magazine (14).

6. A device according to claim 5, characterized in that the card magazine has a plurality of compartments each for the store of at least one data carrier card, that the transport device (10) and the intermediate card store (22) are adjustable relative to one another, that a selected compartment aligns with a transport path (30) of the intermediate card store (22) and that transfer means are provided for transferring a data carrier card from the transport device (10) into the compartment and/or out of the compartment to the transport device (10).

7. An apparatus according to claim 6, characterized in that the transfer means have at least a pusher (36) to push a data carrying card into the respective compartment and/or out of that compartment.

8. A device according to claim 1, characterized in that the transport device (10) is couplable with a collecting compartment (40).

9. A device according to claim 1, characterized in that the transport device (10) has a card turning station (20) for turning a card about its transverse axis and/or longitudinal axis and/or its height axis perpendicular to the plane of the card.

10. An apparatus according to claim 9, characterized in that the intermediate card store (22) is constructed as a turning station.

* * * * *